United States Patent
Nishiyama

(10) Patent No.: US 6,353,787 B2
(45) Date of Patent: Mar. 5, 2002

(54) VEHICLE DECELERATION CONTROL APPARATUS AND CONTROL METHOD THEREOF

(75) Inventor: Keiichi Nishiyama, Brussels (BE)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/731,664

(22) Filed: Dec. 8, 2000

(30) Foreign Application Priority Data

Dec. 16, 1999 (JP) ............................................ 11-357750
Feb. 10, 2000 (JP) ...................................... 2000-033729

(51) Int. Cl.⁷ ............................................... B60K 41/00
(52) U.S. Cl. ............................... 701/93; 701/95; 701/96
(58) Field of Search ............................. 701/93, 96, 95, 701/65; 340/903; 342/70, 71, 72

(56) References Cited

U.S. PATENT DOCUMENTS 6,223,118 B1 * 4/2001 Kobayashi et al. ............ 701/96
6,233,516 B1 * 5/2001 Egawa ........................ 701/96

FOREIGN PATENT DOCUMENTS

| JP | A 9-95222 | 4/1997 |
| JP | A 9-272419 | 10/1997 |

* cited by examiner

Primary Examiner—William A. Cuchlinski, Jr.
Assistant Examiner—Marthe Y. Marc-Coleman
(74) Attorney, Agent, or Firm—Oliff & Berridge, PLC

(57) ABSTRACT

The vehicle deceleration control apparatus adjusts the assist braking force to be applied to each wheel, by adjusting each linear valve and pressure-reducing valve forming the brake system of a vehicle according to shift-position information transmitted from an AT ECU (Automatic Transmission Electronic Control Unit). Thus, generation of driver's unintended assist braking force is controlled, whereby drivability is improved.

17 Claims, 11 Drawing Sheets

VEHICLE DECELERATION CONTROL APPARATUS AND CONTROL METHOD THEREOF

INCORPORATION BY REFERENCE

The disclosure of Japanese Patent Application Nos. 11-357750 filed on Dec. 16, 2000 and 2000-33729 filed on Feb. 10, 2000 including the specification, drawings and abstract are incorporated herein by reference in their entirety.

BACKGROUND OF THE INVENTION

1. Field of the Invention

The invention generally relates to a vehicle deceleration control apparatus that adds deceleration to a vehicle, and a control method thereof. In particular, the invention relates to a vehicle deceleration control apparatus that adds deceleration to a vehicle according to an accelerator operation state, and a control method thereof.

2. Description of the Related Art

A deceleration control apparatus that adding deceleration to a vehicle by applying braking force when the driver releases an accelerator pedal is known as related art of the invention. Japanese Laid-Open Publication No. HEI 9-95222 discloses a deceleration control apparatus that adds braking force to a main brake system when an accelerator pedal is in a deceleration range.

Provision of such a deceleration control apparatus to a vehicle eliminates the need to operate a brake pedal frequently upon gently accelerating/decelerating the vehicle. As a result, deceleration response is improved, so that easy drive can be realized.

However, in the deceleration control apparatus of the related art, unintended deceleration is generated due to the driver's unconscious operation of an accelerator. Therefore, the driver may possibly feel uncomfortable, degrading the driving feeling. The above-mentioned publication discloses that a switch that enables the driver to turn on/off the deceleration control apparatus is provided to overcome such a problem. However, such a selective switch makes the operation troublesome to the driver. Moreover, if the driver wrongly selects or neglects to select, deceleration is generated or is not generated contrary to the driver's intention, so that the driving feeling may rather be degraded.

SUMMARY OF THE INVENTION

In view of the foregoing problems, it is an object of the invention to provide a vehicle deceleration control apparatus capable of generating assist deceleration that is less uncomfortable to the driver.

In order to achieve the above-mentioned object, a vehicle deceleration control apparatus according to an aspect of the invention includes determining device that determines an accelerator operation state of a driver, deceleration adding device that adds deceleration to a vehicle, and a control device that controls the deceleration adding device so as to add the deceleration when the determining device determines that the accelerator operation state is a predetermined accelerator operation state. The vehicle deceleration control apparatus further includes an operation element capable of being operated by the driver, and provided to change an operating state of a vehicle movement controller other than the deceleration adding device. The control device changes an operating state of the It deceleration adding device according to an operation state of the operation element.

According to the invention, in the vehicle deceleration control apparatus that adds assist deceleration by the deceleration adding device when the accelerator operation state is a predetermined accelerator operation state, an operating state of the deceleration adding device is changed according to an operation state of the operation element (e.g., a switch or lever for changing an operating state of a driving system) that is capable of being operated by the driver and provided to change an operating state of the vehicle movement controller other than the deceleration adding device. Thus, addition of the deceleration can be adjusted according to a current operating property of the vehicle, thereby allowing addition of the deceleration that is comfortable to the driver.

For example, the operation element is a changing device that changes an operating state of an automatic transmission. In this case, the deceleration is actively added in a shift position where the driver intends to actively apply engine brake. On the other hand, the deceleration to be added is suppressed in a shift position where the driver does not intend to use the engine brake. Thus, the assist deceleration that is less uncomfortable to the driver can be added.

The changing device may either be shift-range selecting device, or shift-mode changing device that selectively changes a shift mode between an auto-shift mode in which gearshift is automatically conducted according to a running state of the vehicle and a manual shift mode in which gearshift to a corresponding gear is conducted according to an operation state of a gearshift operation member by the driver. By adjusting the assist deceleration according to the shift mode as switched by the driver, addition of the assist deceleration can be conducted further as intended by the driver.

The control device may limit the deceleration to be added by the deceleration adding device, in a case where the operation element is in a predetermined operation state. For example, in a case where the shift-mode changing device is in the auto-shift mode, the control device preferably limits the deceleration to be added by the deceleration adding device as compared to a case where the shift-mode changing device is in the manual shift mode. The control device may inhibit addition of the deceleration by the deceleration adding device in a case where the shift-mode changing device is in the auto-shift mode, and may control the deceleration adding device so as to add the deceleration to the vehicle in a case where the shift-mode changing device is in the manual shift mode.

Alternatively, the control device may adjust a rate of change with time in the deceleration to be added by the deceleration adding device, according to the operation state of the operation element. Even if the deceleration generated after a predetermined time is the same, application of the deceleration can be conducted as intended by the driver by changing a way to apply the deceleration.

Alternatively, the vehicle deceleration control apparatus according to the invention may start adding the deceleration a predetermined delay time after the accelerator operation state becomes a predetermined accelerator operation state. This delay time may be set based on variation in the accelerator operation state.

The driver tends to operate the accelerator unconsciously. The inventor found that the larger the variation with time in driver's accelerator operation is, the more frequently the accelerator is rendered in a predetermined operation state (i.e., the state in which the deceleration is applied) for a short time, whereby unintended deceleration is generated, degrading the driving feeling. Therefore, according to the invention, in the case of the driver having large variation with time in accelerator operation, a delay time is provided which is longer than the time period during which the accelerator may be rendered in the predetermined operation state due to the driver's unconscious operation. Thus, the deceleration is added after the delay time, so that generation of unintended deceleration is controlled.

It is preferable that the delay time be set to a larger value as a frequency at which the accelerator operation state varies is higher. Alternatively, the delay time may be set to a larger value as a frequency at which the accelerator operation state is determined to be the predetermined operation state is higher. It can be determined that, as the frequency at which the accelerator operation state varies is higher, and as the frequency at which the accelerator operation state is determined to be the predetermined operation state is higher, the driver has larger variation with time in his/her unconscious accelerator operation. Therefore, it is preferable to increase the delay time in the case of such a driver.

In addition, a vehicle provided with the vehicle deceleration control apparatus according to the invention may have an automatic transmission having a plurality of shift patterns, and the control device may change an operating state of the deceleration adding device according to a current shift pattern of the automatic transmission. By adjusting the applied deceleration according to the shift pattern, the assist deceleration can be applied as intended by the driver.

This deceleration adding device preferably adds the deceleration by controlling braking force. In a case where a mechanism for assisting the brake operating capability with the braking force is used, the invention can be implemented only with simple modification.

The aspect of the invention is not limited to such a vehicle deceleration control apparatus as described above. Another aspect of the invention is, e.g., a vehicle provided with a vehicle deceleration control apparatus, and a method for controlling a vehicle deceleration control apparatus.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF THE PREFERRED EMBODIMENTS

Hereinafter, preferred embodiments of the invention will be described in detail with reference to the accompanying drawings.

Figure 1:
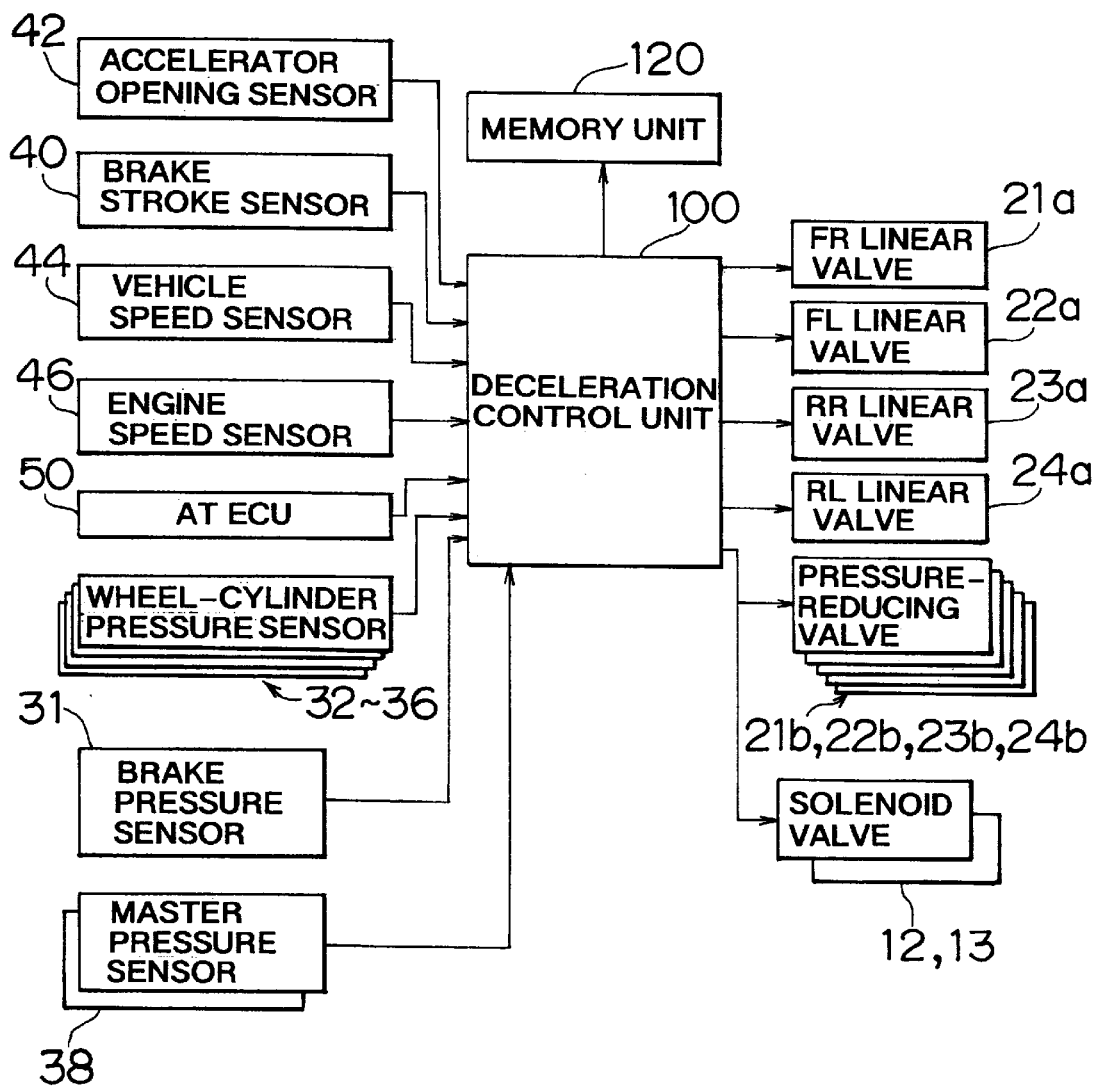
FIG. 1 is a diagram showing the structure of a deceleration control apparatus according to the invention.
Figure 2:
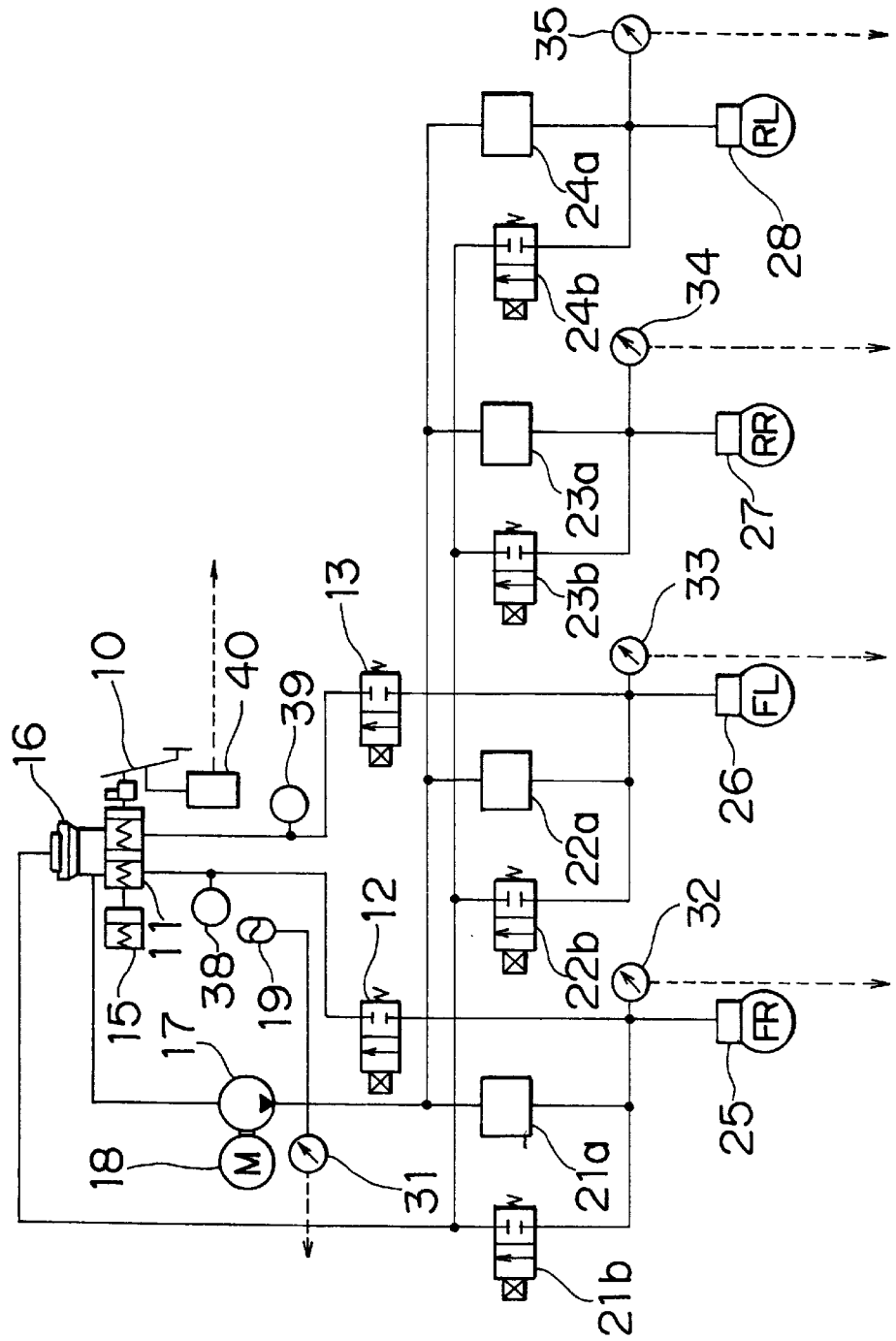
FIG. 2 is a diagram showing the structure of a brake system of a vehicle provided with a deceleration control apparatus according to the invention.

FIG. 1 is a diagram showing the structure of a deceleration control system including a deceleration control apparatus according to the invention. FIG. 2 is a diagram showing the structure of a brake system of a vehicle provided with the deceleration control apparatus according to the invention.

First, the structure of the brake system of the vehicle will be described with reference to FIG. 2. In this vehicle, wheel cylinders 25 to 28 for braking the wheels are provided at front wheels FR, FL and rear wheels RR, RL, respectively, in order to conduct braking of the vehicle.

A brake pedal 10 for operating this brake system is connected to a piston shaft of a master cylinder 11. A brake pressure sensor for detecting an operation state of the brake pedal is connected to the brake pedal 10. A stroke simulator 15 is connected to the master cylinder 11 on the side opposite to the brake pedal 10 so as to generate appropriate repulsion force against the operation of the brake pedal 10.

Two hydraulic fluid lines extending from the master cylinder 11 are respectively connected to the wheel cylinders 25, 26 of the right and left front wheels FR, FL through solenoid valves 12, 13. A master pressure sensor 38 is provided in a path from the master cylinder 11 to the solenoid valve 12, and a master pressure sensor 39 is provided in a path from the master cylinder 11 to the solenoid valve 13.

A hydraulic fluid line extending from a reservoir tank 16 is connected to a pump 17 driven by a motor 18, and a hydraulic fluid line extending from the pump 17 is connected to the wheel cylinders 25 to 28 of the respective wheels through the respective linear valves 21a to 24a. A brake pressure sensor 31 and an accumulator 19 are provided between the pump 17 and the branched portion to the linear valves 21a to 24a. Pressure-reducing valves 21b to 24b are respectively connected to hydraulic fluid lines extending from the respective wheel cylinders 25 to 28 back to the reservoir tank 16. The wheel cylinders 25 to 28 are respectively provided with wheel-cylinder pressure sensors 32 to 35.

A deceleration control unit 100 forming a control device of the vehicle deceleration control apparatus according to the invention is supplied with the respective output signals of an accelerator opening sensor 42, a brake stroke sensor 40, a vehicle speed sensor 44, an engine speed sensor 46, wheel-cylinder pressure sensors 32 to 35, a brake pressure sensor 31, and master pressure sensors 38, 39. The deceleration control unit 100 also communicates with an automatic-transmission electronic control unit (AT ECU) 50 that is described later.

Moreover, the deceleration control unit 100 has a memory unit 120 for storing tables, constants and the like used in the deceleration control, and controls the linear valves 21a to 24a and pressure-reducing valves 21b to 24b that are connected to the respective wheel cylinders 25 to 28, and the solenoid valves 12, 13.

The braking operation of this brake system will now be described. Upon stepping on the brake pedal 10, the piston shaft of the master cylinder 11 is pressed, whereby a hydraulic pressure (master pressure) corresponding to the operation amount is generated. The solenoid valves 12, 13 are normally in a cut-off state, so that the master pressure is not directly transmitted to the wheel cylinder 25 of the right front wheel FR and the wheel cylinder 26 of the left front wheel FL. The hydraulic fluid supplied from the reservoir tank 16 according to the operation amount of the master cylinder 11 is pressurized by the pump 17 driven by the motor 18 and the accumulator 19. Then, the hydraulic fluid thus pressurized is supplied in parallel to the wheel cylinders 25, 26, 27, 28 of the right and left front wheels FR, FL and the right and left rear wheels RR, RL through the FR linear valve 21a, FL linear valve 22a, RR linear valve 23a and RL linear valve 24a, respectively. At this time, the deceleration control unit 100 controls the linear valves 21a to 24a independently, thereby enabling independent adjustment of the respective hydraulic pressures (wheel cylinder pressures) of the wheel cylinders 25 to 28. Thus, the braking force applied to each wheel can be independently controlled. The hydraulic fluid is returned to the reservoir tank 16 through the pressure-reducing valves 21b to 24b connected to the respective wheel cylinders 25 to 28.

When the brake system is in an abnormal state, the solenoid valves 12, 13 are made conductive so that the master pressure of the master cylinder 11 is transmitted to the wheel cylinder 25 of the right front wheel FR and the wheel cylinder 26 of the left front wheel FL through the solenoid valves 12, 13, respectively, thereby braking both front wheels FR and FL.

Figure 3:
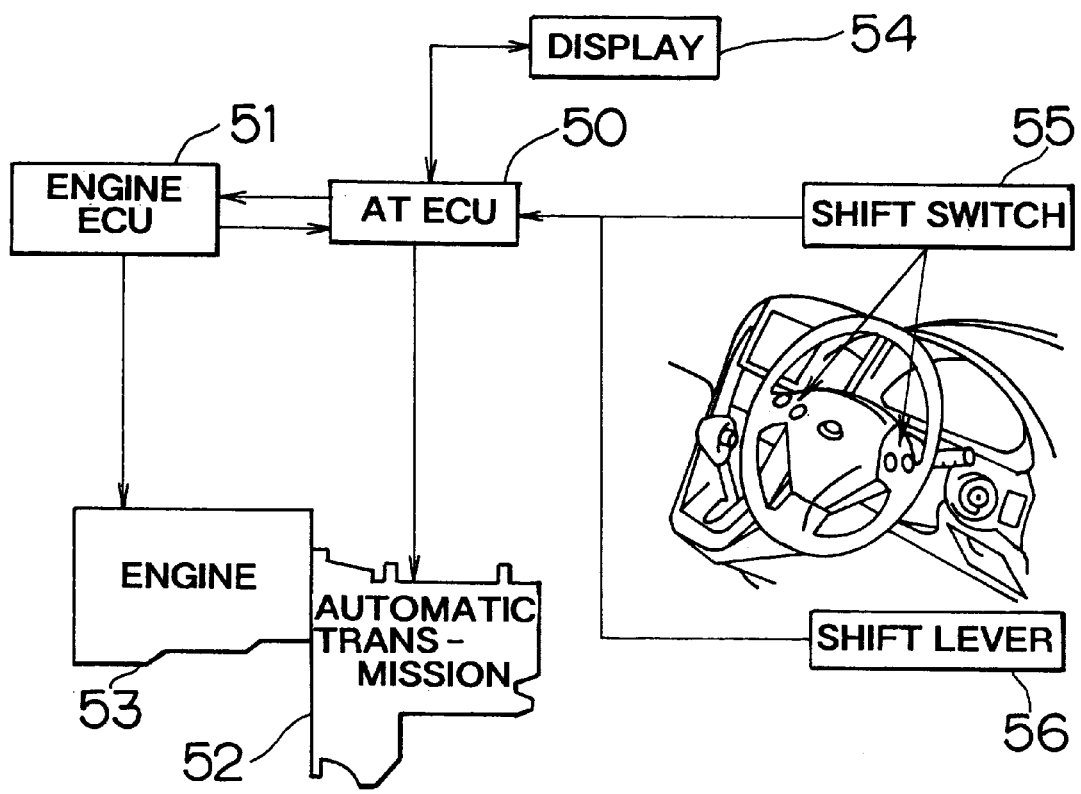
FIG. 3 is a diagram showing the structure of a driving gearshift system of a vehicle provided with a deceleration control apparatus according to the invention.
Figure 4:
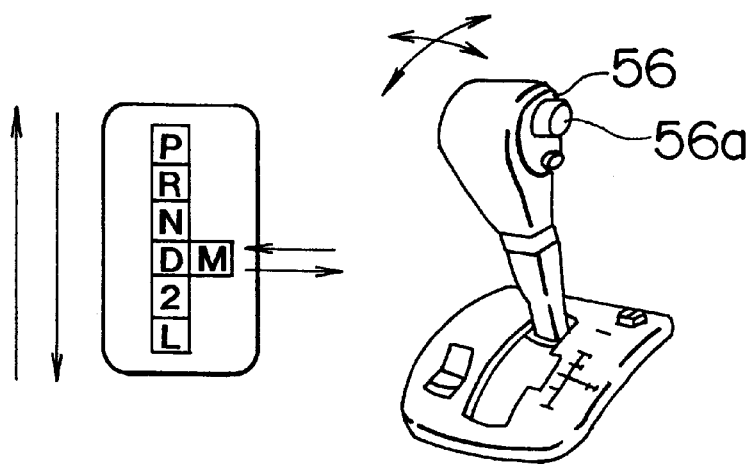
FIG. 4 is a diagram showing a shift lever in FIG. 3.

Hereinafter, a gearshift system of this vehicle will be described with reference to FIGS. 3 and 4. FIG. 3 is a schematic diagram of the overall structure of the gearshift system. FIG. 4 is a diagram illustrating a shift lever 56 thereof.

The vehicle of this embodiment transmits the driving force of an engine 53 to a driving wheel (both front wheels FR and FL in the case of an FF (front engine-front drive) vehicle) through an automatic transmission 52. The automatic transmission 52 and the engine 53 are respectively controlled by the AT ECU 50 and the engine ECU 51. The AT ECU 50 switches a gearshift state according to the respective operation states of a shift switch 55 and the shift lever 56, and displays the switched gearshift state on a display 54 for notification to the driver.

As shown in FIG. 4, the shift lever 56 can be switched among P (Parking), R (Reverse), N (Neutral), D (Drive), 2 (Second) and L (First), and can also be switched between a D range and an M (Manual) range. In addition, the shift lever 56 has a switch button 56a for switching to an OD (Overdrive) range. When the shift lever 56 is set to the D range, the AT ECU 50 enters an auto-shift mode in which the automatic transmission 52 is controlled by automatically selecting an optimal shift position based on the revolution speed of the engine 53, the vehicle speed and the like. On the other hand, when the shift lever 56 is set to the M range, the AT ECU 50 enters a manual shift mode in which upshift and downshift to any shift position is possible by operating the shift switch 55.

Even when the driver does not step on the brake pedal 10, the deceleration control apparatus according to the invention conducts the deceleration control, as long as predetermined conditions are satisfied, in which the deceleration control apparatus adds the braking force to generate the deceleration, thereby assisting in the engine brake effect that tends to be insufficient in the vehicles provided with automatic transmission. Such deceleration control is hereinafter referred to as engine-brake assist control.

Figure 5:
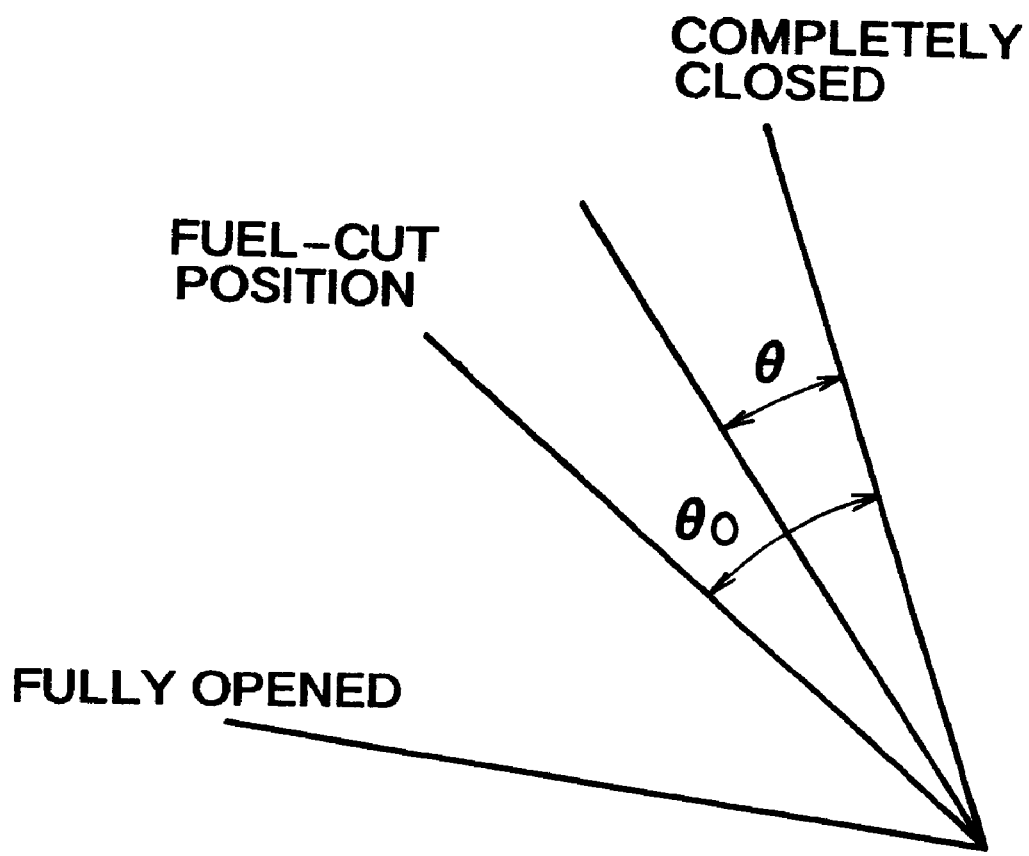
FIG. 5 is a diagram illustrating accelerator pedal opening.

Basic control thereof will now be described. The deceleration control unit 100 monitors an operation state of the accelerator pedal based on an output signal of the accelerator opening sensor 42 mounted to the accelerator pedal. When the accelerator pedal that has been stepped on is returned, an engine control unit (not shown) reduces supply of the fuel and air, thereby reducing the engine speed. This resistance causes the engine brake effect producing the braking force. In the case where the accelerator pedal is returned from a fuel shut-off position (fuel cut position; accelerator opening θ0) toward a fully closed position (accelerator opening 0) as shown in FIG. 5, the deceleration control unit 100 determines that the accelerator pedal is in a return operation state. The deceleration control unit 100 then controls the linear valves 21a to 24a and pressure-reducing valves 21b to 24b so as to adjust the respective hydraulic pressures acting on the wheel cylinders 25 to 28 of the wheels, thereby adding a predetermined braking force (assist braking force) to decelerate the vehicle. In the medium and high speed regions, the engine control unit cuts off the fuel supply to the engine at the time the accelerator pedal is returned from the fuel shut-off position toward the fully closed position, thereby achieving larger deceleration.

In order to conduct such engine-brake assist control that is comfortable to the driver, the invention conducts assist control according to any one of the three embodiments described below. It should be understood that assist control may be conducted according to combination of these methods.

Figure 6:
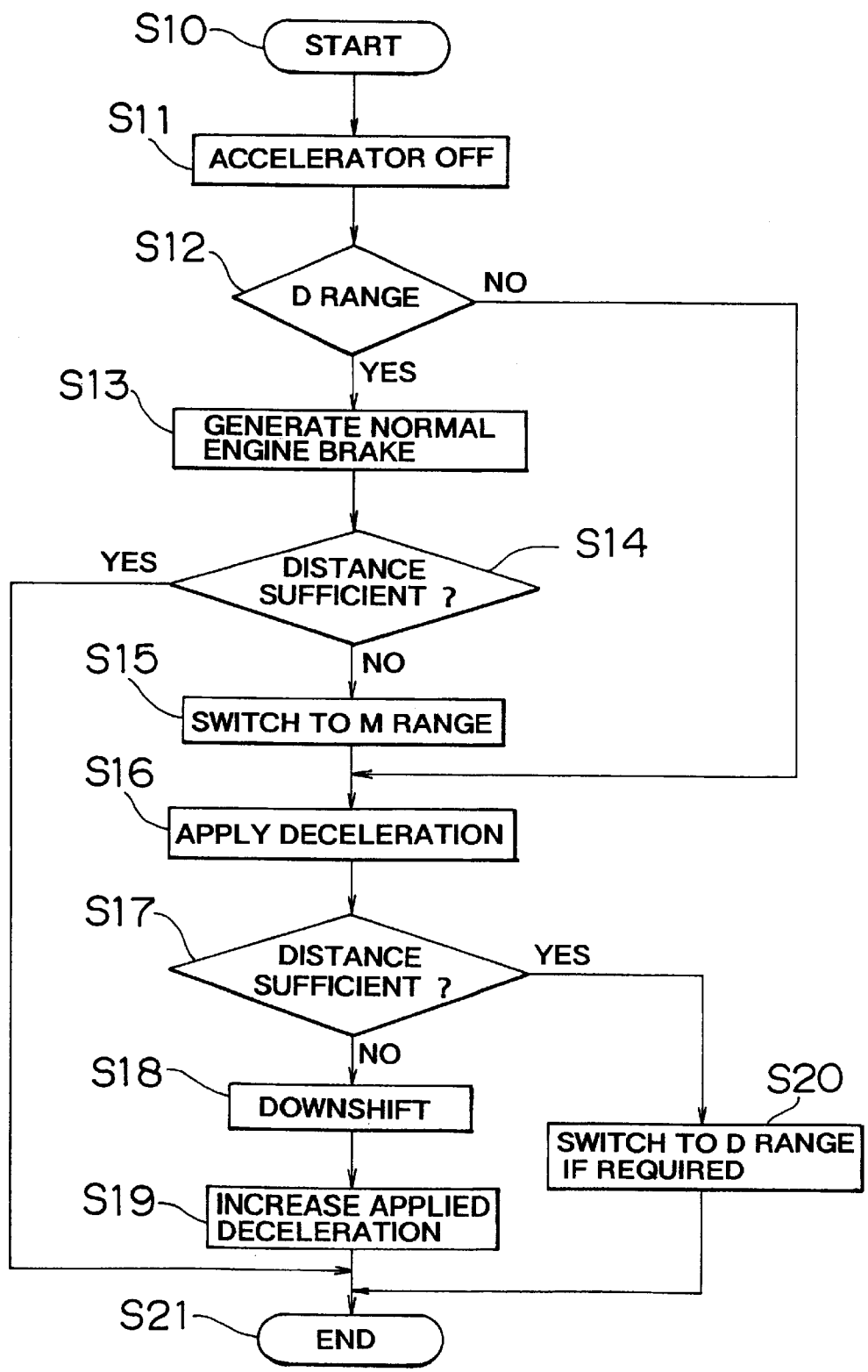
FIG. 6 is a flowchart showing a control operation of a deceleration control apparatus according to a first embodiment of the invention.

Assist control of a first embodiment of the invention is conducted according to the position of the shift lever 56. Specific control operation in the case of adjusting the distance to the preceding vehicle on an expressway will now be described by way of example with reference to FIGS. 1 to 6. FIG. 6 is a flowchart illustrating the vehicle control in adjusting the distance to the preceding vehicle.

It is herein assumed that deceleration of the vehicle is conducted only with the engine brake and the engine brake assist effect obtained by the deceleration control apparatus of the invention, and that the distance to the preceding vehicle is adjusted only with the operation of the accelerator pedal. In other words, it is assumed that the driver does not operate the brake pedal at all.

When the vehicle gets close to the preceding vehicle during running (Step S10), the driver returns the accelerator pedal to conduct an OFF operation as shown in Step S11. When the OFF operation is sensed, the deceleration control unit 100 reads positional information of the shift lever 56 out of the information transmitted from the AT ECU 50, and determines whether the shift lever 56 is in the D range or the M range (Step S12).

If in the D range, the control proceeds to Step S13. In this case, the above-mentioned engine brake assist control is not conducted, so that only the normal engine brake is generated. As a result, the vehicle is decelerated, whereby the distance to the preceding vehicle is increased. If the driver determines in Step S14 that the distance thus increased is sufficient, the subsequent control is not conducted, continuing normal running. On the other hand, if the driver determines in Step S14 that the distance is not sufficient, the control proceeds to Step S15, in which the shift lever 56 is switched to the M range.

If the shift lever 56 has already been in the M range in Step S12, and if the shift lever 56 is switched to the M range in Step S15, the control proceeds to Step S16, in which the above-mentioned engine brake assist control is conducted to apply deceleration larger than that of the normal engine brake. Thus, the vehicle speed is reduced as compared to that of Step S13, whereby the distance to the preceding vehicle can further be increased.

If the distance thus increased is still insufficient and further deceleration is required in Step S17, the control proceeds to Step S18, in which the automatic transmission 52 downshifts as instructed by the AT ECU 50. Then, applied deceleration is increased in the engine brake assist control (Step S19). Accordingly, the vehicle speed is further reduced, whereby a sufficient distance to the preceding vehicle can be assured.

The M range is a range in which the driver can arbitrarily select the shift position, so that the MT (Manual Transmission)-like gearshift operation is realized by a simple operation that does not require a clutch operation. Accordingly, in the M range, it is preferable that the difference in engine driving force, engine brake and the like be clear between the shift positions. In the D range, however, such a difference between the shift positions need not be clear. The deceleration control apparatus according to the invention actively conducts the engine brake assist control in the M range so as to apply the engine brake effect according to the shift position more actively than in the D range. Moreover, the engine brake assist control is switched ON/OFF by the position (mode switching) of the shift lever 56. Therefore, unlike the case where an exclusive switch is provided as in the related art of the invention, driver's unintended assist braking force due to his/her neglecting to operate the switch is not generated, and also, no troublesome operation is required. Moreover, the number of components is not increased, and a control program in the deceleration control unit 100 need only be changed.

Although the embodiment in which the assist braking force is applied only in the M range has been described, the assist braking force smaller than that in the M range may also be applied in the D range. In addition, magnitude of the assist braking force may be switched by turning ON/OFF the OD button. In the case where there is no switching between the M range and D range, the control may be conducted only according to the shift position.

Hereinafter, assist control according to a second embodiment will be described. The second embodiment adjusts generation of the deceleration according to the driver's habit in operating the accelerator pedal.

Figure 7:
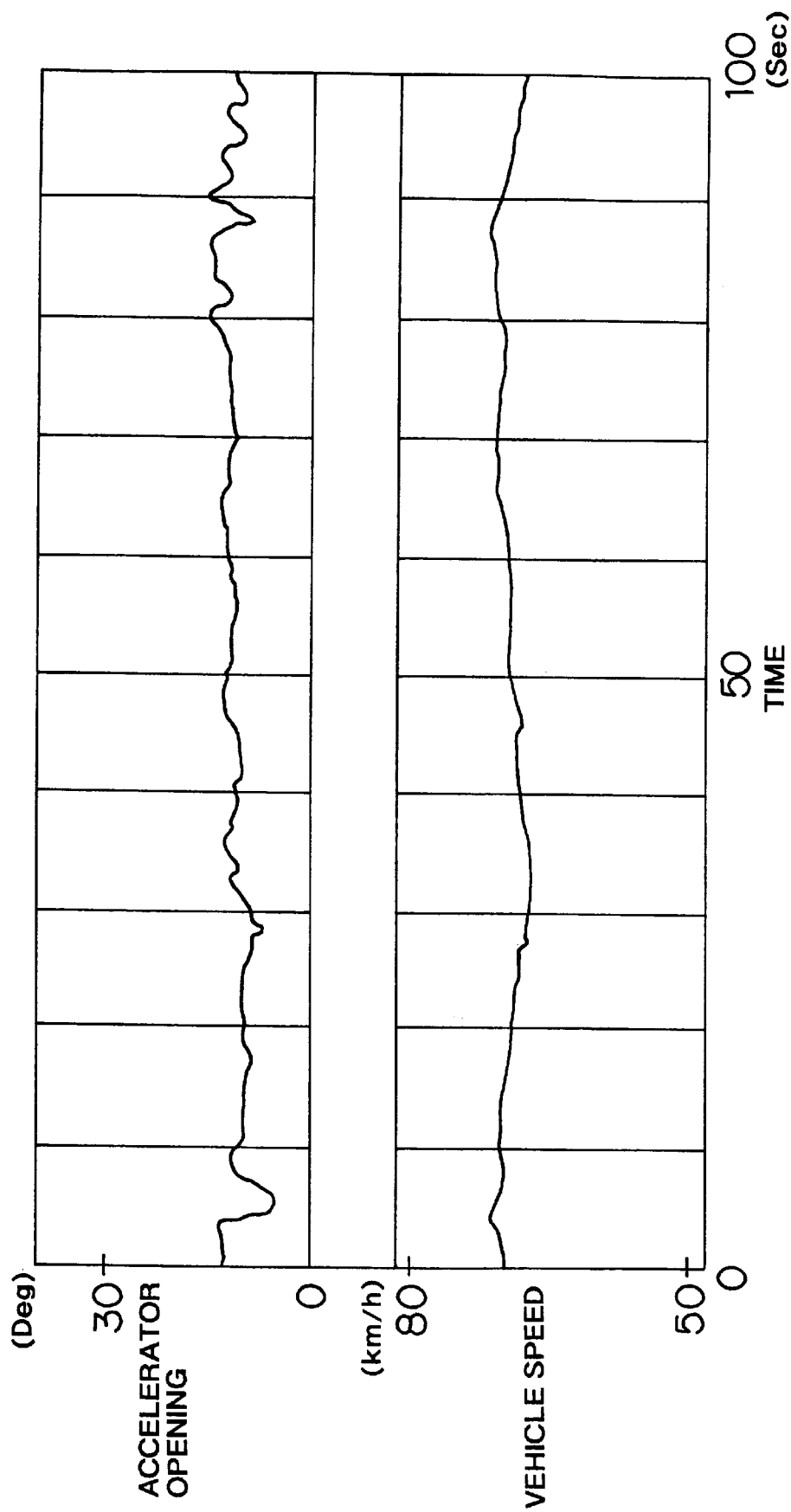
FIG. 7 is a diagram showing the relation between a vehicle speed and an accelerator operation of the driver who smoothly operates an accelerator.
Figure 8:
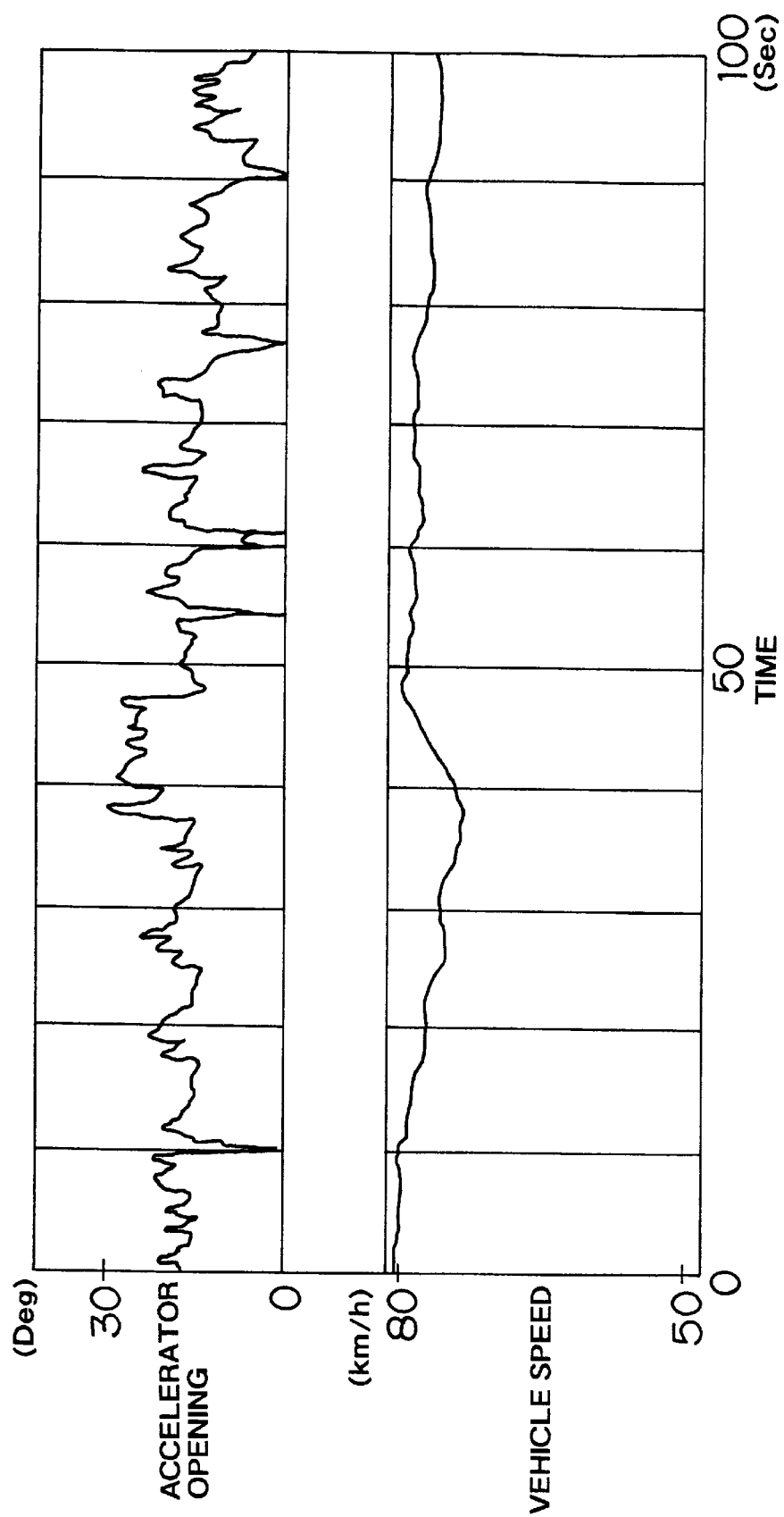
FIG. 8 is a diagram showing the relation between a vehicle speed and an accelerator operation of the driver who roughly operates an accelerator.

FIGS. 7 and 8 show comparison of variation with time between the accelerator operation amount by the driver and the vehicle speed. FIG. 7 shows an example of the driver who smoothly operates the accelerator, and FIG. 8 shows an example of the driver who roughly operates the accelerator. As shown in FIG. 7, when trying to maintain the vehicle speed constant, the driver who smoothly operates the accelerator gently varies the accelerator opening between 7 degrees and 15 degrees, resulting in modest variation in the vehicle speed. On the other hand, the driver who roughly operates the accelerator frequently varies the accelerator opening and the accelerator opening sometimes reaches zero degree. As a result, variation in the vehicle speed is increased, and variation period is reduced.

Figure 9:
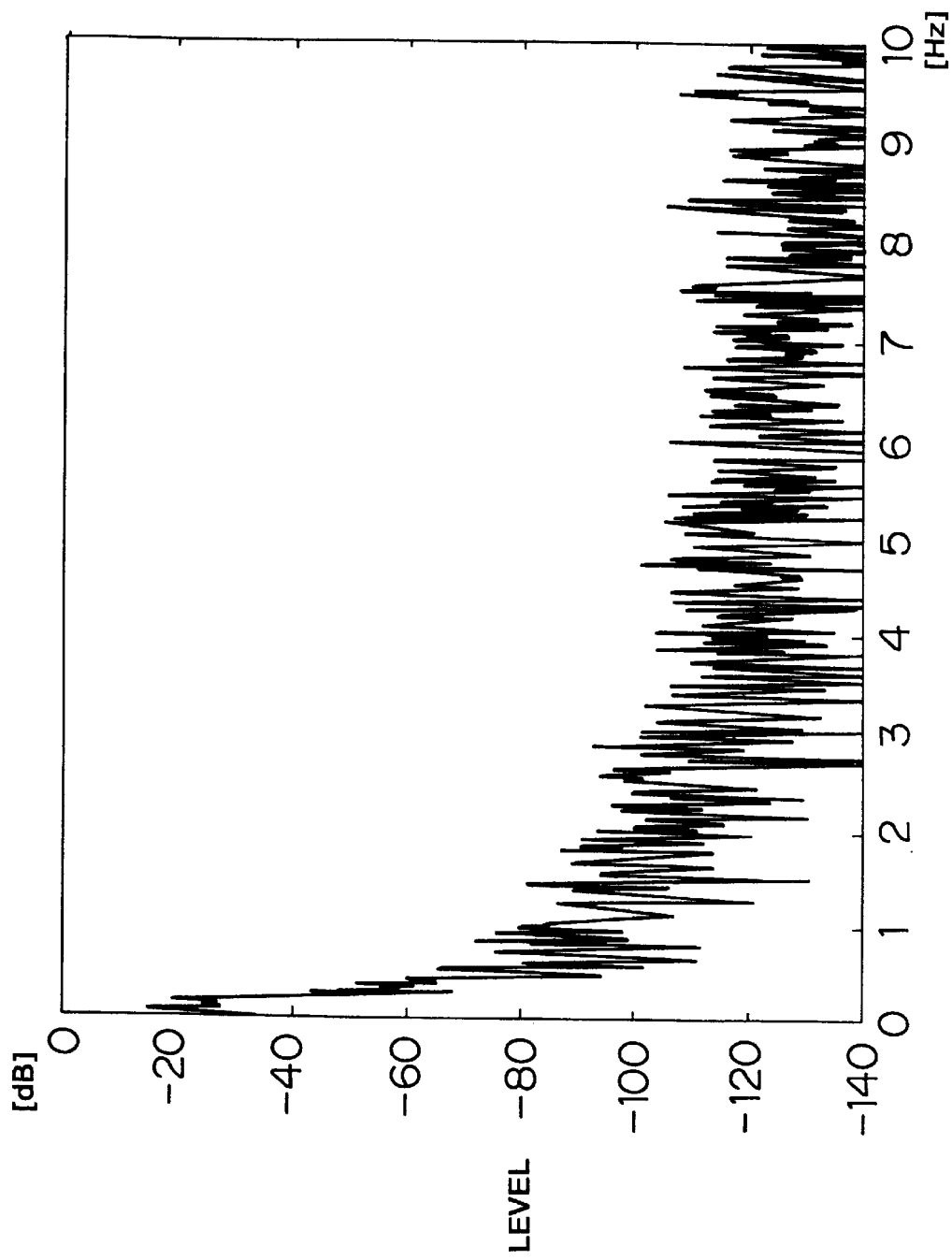
FIG. 9 is a graph showing the result of FFT (fast Fourier transform) analysis of the accelerator operation in FIG. 7.
Figure 10:
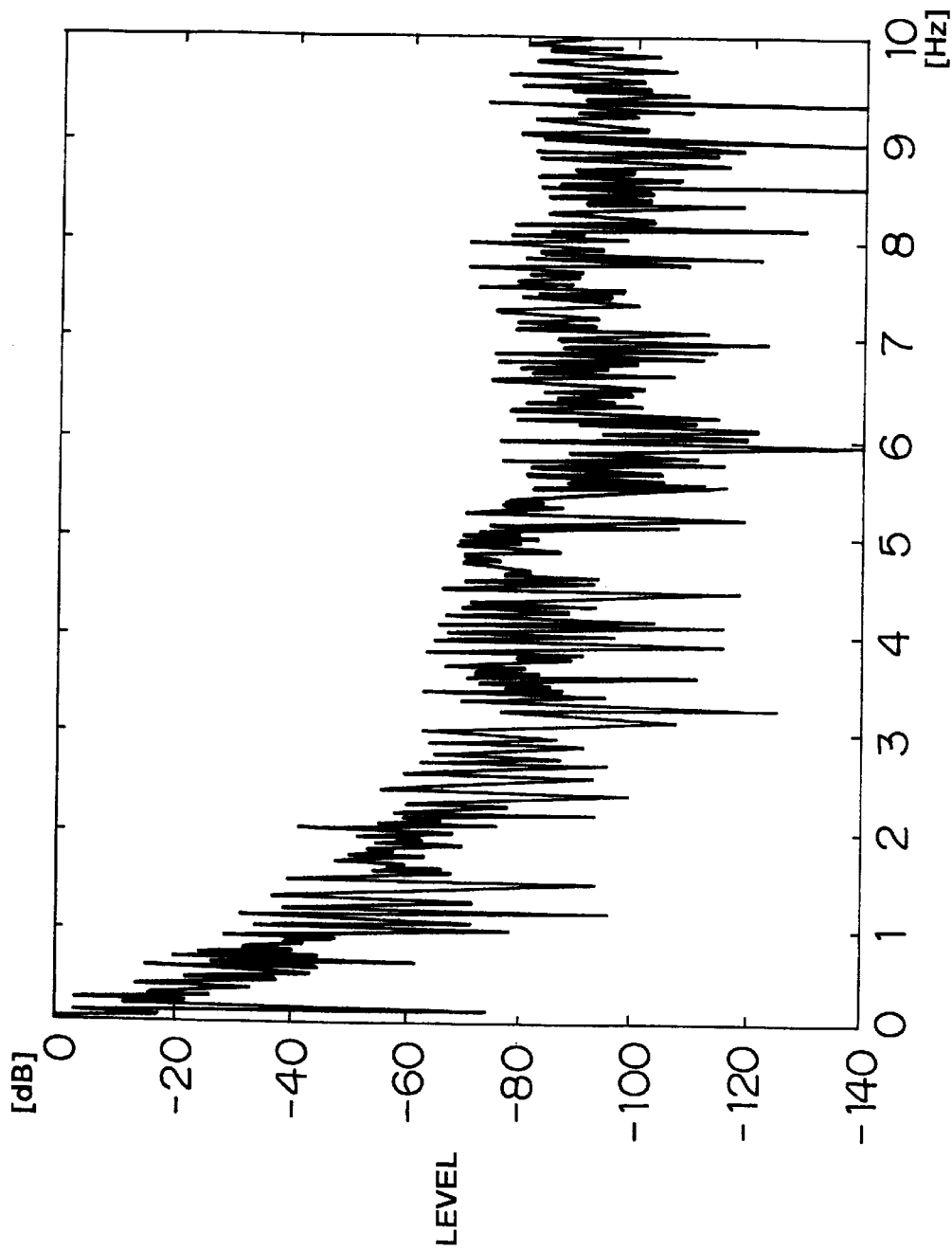
FIG. 10 is a graph showing the result of FFT analysis of the accelerator operation in FIG. 8.

FIGS. 9 and 10 show the result of fast Fourier transform (FFT) analysis of the accelerator operation amount of the respective drivers. It can be seen from the figures that the amount of high frequency components is smaller in the case of the driver who smoothly operates the accelerator (see FIG. 9) than in the case of the driver who roughly operates the accelerator (see FIG. 10).

From the foregoing result, the inventors found that the larger the amount of high frequency components in the FFT analysis result is, the more roughly the driver operates the accelerator. Thus, the driver who roughly operates the accelerator frequently conducts an accelerator returning operation. Therefore, if the assist braking force is generated according to such an accelerator returning operation, driver's unintended deceleration is generated, so that the drivability may possibly be degraded.

Then, in the second embodiment, the accelerator operation state by the driver is monitored, and in the case where the amount of high frequency components is large or in the case where the OFF frequency, i.e., the frequency at which the accelerator opening reaches zero degree, is high, it is determined that he/she is a driver who roughly operates the accelerator. Thus, a time lag is provided between the accelerator returning operation and actual start of the assist control.

Figure 11:
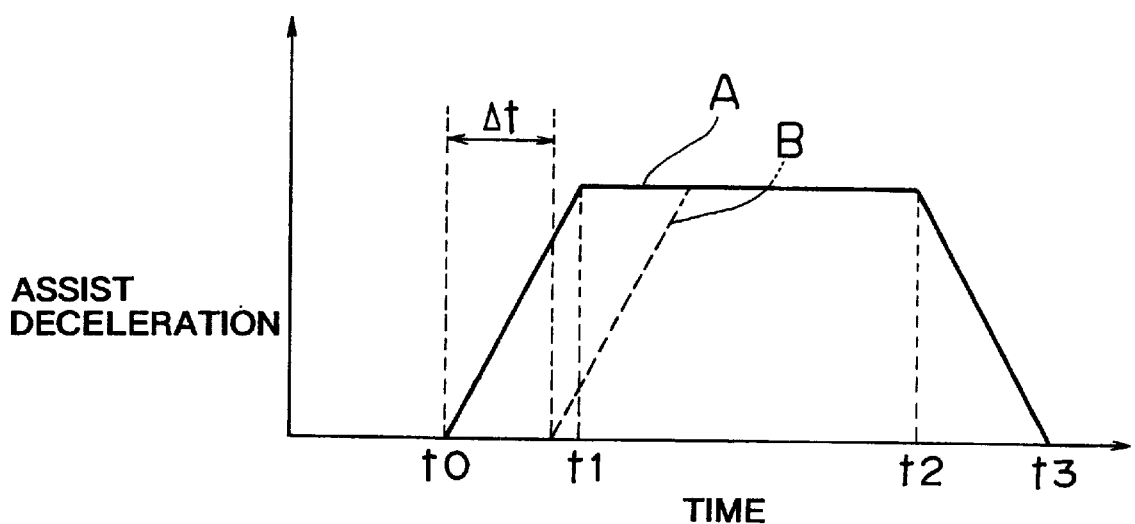
FIG. 11 is a diagram showing a control operation of a deceleration control apparatus according to a second embodiment of the invention.

More specifically, as shown in FIG. 11, in the case of the driver A who smoothly operates the accelerator, application of assist deceleration is started at time t0 when the accelerator returning operation is conducted. The assist deceleration is kept constant from time t1 when the accelerator opening reaches zero degree. The assist deceleration is reduced from time t2 when the driver again starts stepping on the accelerator. Application of the assist deceleration is discontinued at time t3 when the accelerator opening exceeds the fuel-cut position.

Figure 12:
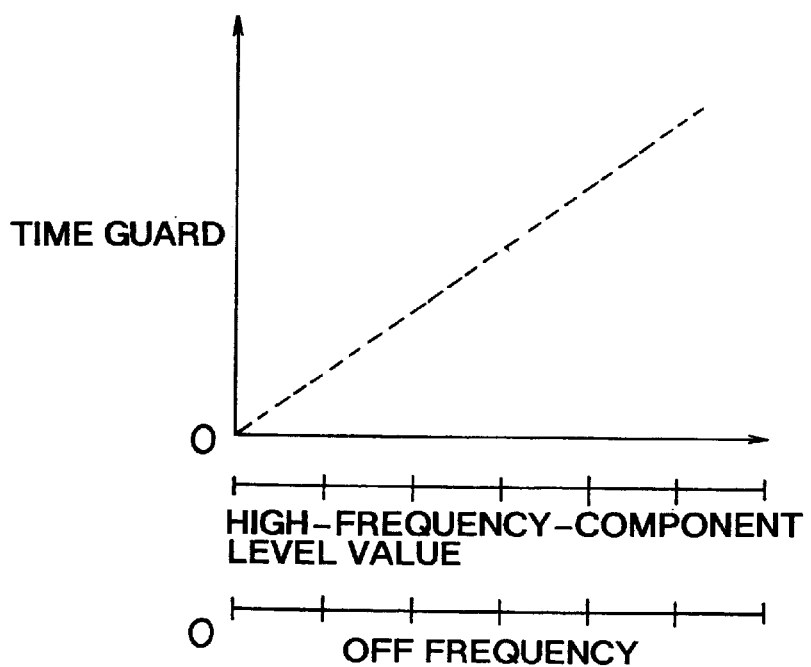
FIG. 12 is a diagram illustrating setting of a delay time $\Delta t$ in FIG. 11.

In the case of the driver B who roughly operates the accelerator, application of the assist deceleration is started if the accelerator returning operation continues until the time delayed by a predetermined time Δt from time t0 when the accelerator returning operation was conducted. The delay time Δt for applying the assist braking force is preferably at most about 2 to 3 seconds. As shown in FIG. 12, the delay time Δt is set according to a predetermined high-frequency-component level value obtained by the FFT analysis, or according to the OFF frequency at which the accelerator opening reaches zero degree. Alternatively, the delay time Δt may be set according to the frequency of the accelerator returning operation, instead of the OFF frequency. After the driver again starts stepping on the accelerator at time t2, control is conducted in a manner similar to that of the case of the driver A who smoothly operates the accelerator.

Thus, in the case where switching between the accelerator returning operation and stepping-on operation is conducted during a short time like the driver who roughly operates the accelerator frequently does during normal running, the assist braking force is not applied, so that driver's unintended deceleration is not generated. In the case where the accelerator returning operation is continued for a given time period in order to actually decelerate the vehicle, the assist braking force is applied, thereby allowing reliable deceleration of the vehicle. When the driver steps on the accelerator, such a delayed operation is not conducted, so that the acceleration performance is maintained, whereby the drivability is improved.

Figure 13A:
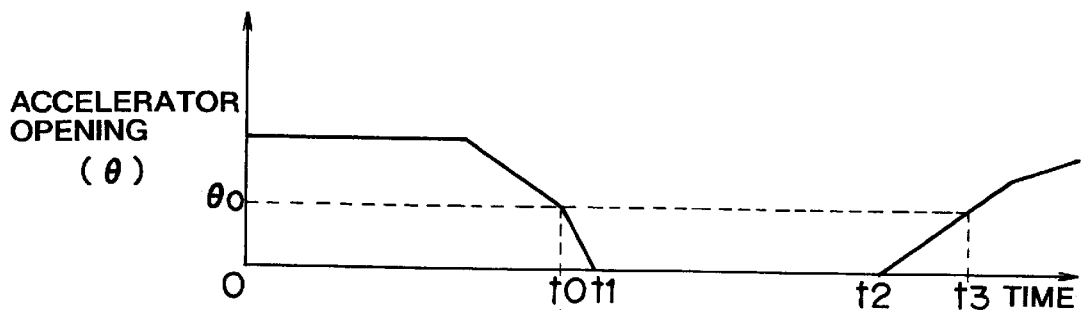
FIGS. 13A to 13C show a change with time in accelerator opening and hydraulic pressure supplied to a wheel cylinder in a control operation of a deceleration control apparatus according to a third embodiment of the invention.
Figure 13B:
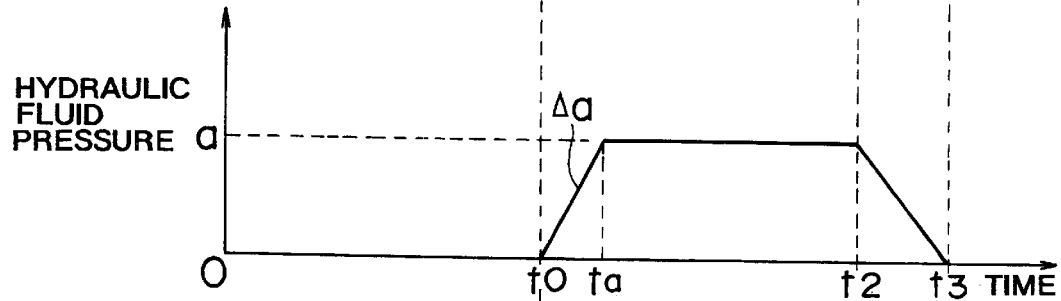
Figure 13C:
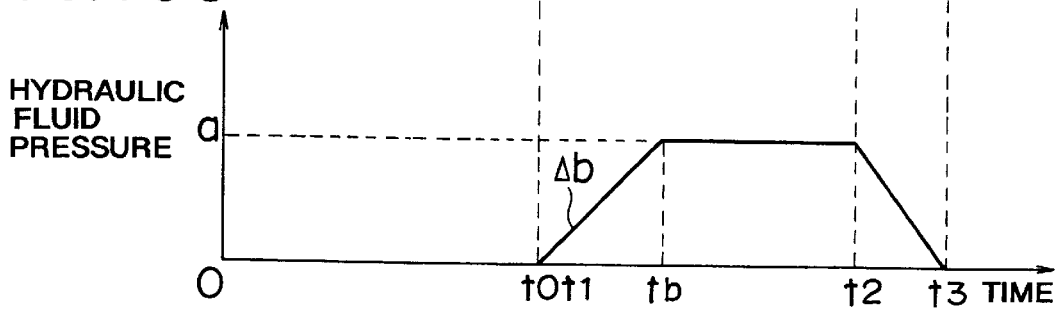

Hereinafter, assist control according to a third embodiment will be described. Like the first embodiment, the assist control of the third embodiment is conducted according to the position of the shift lever 56. However, the third embodiment is different from the first embodiment in that in the first embodiment, the engine brake control is inhibited during selection of the D range, where as in the third embodiment, the rate of change with time, i.e., the rate of increase, in deceleration to be applied is varied between during selection of the D range and during selection of the M range. Specific control will be described with reference to FIGS. 13A, 13B and 13C. FIGS. 13A to 13C show a change with time in the accelerator opening and in the pressure of hydraulic fluid supplied to a wheel cylinder.

It is now assumed that the driver operates the accelerator pedal as shown in FIG. 13A. More specifically, the driver returns the accelerator pedal so that the accelerator opening reaches the value θ0 corresponding to the fuel-cut position at time t0 and then reaches zero corresponding to the fully closed position at time t1. Thereafter, the driver again steps on the accelerator pedal at time t2 so that the accelerator opening again exceeds the value θ0 corresponding to the fuel-cut position at time t3.

In this control operation, in the case where the M range is selected by the shift lever 56, the deceleration control unit 100 controls the linear valves 21a to 24a and the pressure-reducing valves 21b to 24b such that the pressure of the hydraulic fluid supplied to the wheel cylinders 25 to 28 varies as shown in FIG. 13B. In other words, the hydraulic pressure is raised from the time the accelerator pedal opening becomes smaller than the value θ0 corresponding to the fuel-cut position. At this time, the rate at which the pressure is raised is limited to Δa. The hydraulic pressure actually becomes stable at a fixed value a at time ta that is later than time t1 when the accelerator opening reaches zero. The assist braking force is increased by raising the hydraulic pressure as such. When the driver steps on the accelerator pedal at time t2, the hydraulic pressure is reduced so as to reach zero at time t3 when the accelerator pedal opening reaches the fuel-cut position θ0, whereby application of the assist braking force is discontinued.

In the case where the D range is selected by the shift lever 56, the deceleration control unit 100 controls the linear valves 21a to 24a and the pressure-reducing valves 21b to 24b such that the pressure of the hydraulic fluid supplied to the wheel cylinders 25 to 28 varies as shown in FIG. 13C. In other words, the hydraulic pressure is raised from the time the accelerator pedal opening becomes smaller than the value θ0 corresponding to the fuel-cut position. At this time, the rate at which the pressure is raised is limited to Δb that is smaller than Δa. The hydraulic pressure actually becomes stable at the fixed value a at time tb that is later than time ta. The assist braking force is increased by raising the hydraulic pressure as such. In this case, however, the assist braking force is increased more gently than in the case of the M range so that it works gently. Thus, deceleration is applied as intended by the driver. The operation after the driver steps on the accelerator pedal at time t2 is the same as that in the case of the M range.

The hydraulic pressure is herein raised to the same value both in the D range and the M range. However, in the case of the D range, the hydraulic pressure may be raised to a value lower than that in the case of the M range so as to reduce the braking force to be applied.

Herein, the embodiments have been described in which the driver switches between the D range and the M range with the shift lever 56. However, the AT ECU 50 may have a function to switch between the D-range running and the M-range running based on the running state, so that the deceleration control unit 100 may control the deceleration according to the switching. Alternatively, the AT ECU 50 may have a function to select a shift pattern from a plurality of shift patterns according to the running state, so that the deceleration control unit 100 may control the deceleration according to the selected shift pattern. The plurality of shift patterns as used herein include, e.g., an output-oriented shift pattern, a fuel economy-oriented shift pattern, and a normal shift pattern.

In the foregoing description, the embodiments have been explained in which the deceleration is applied by directly controlling the brake system. However, the deceleration may alternatively be applied by acting on the driving system.

As has been described above, according to the invention, generation of driver's unintended deceleration can be suppressed by adjusting application of the deceleration according to the shift position. Alternatively, generation of driver's unintended deceleration can be suppressed by recognizing the driver's habit in operating the accelerator, and delaying application of the deceleration. The drivability can be improved in either case.

What is claimed is:

1. A vehicle deceleration control apparatus, comprising:
   a detecting device that detects an accelerator operation state of a driver;
   a determining device that determines whether or not the accelerator operation state is a return operation state based on a detection result of the detecting device;
   a deceleration adding device that adds deceleration to a vehicle;
   an operation element capable of being operated by the driver, and provided to change an operating state of a vehicle movement controller other than the deceleration adding device; and
   a control device that sets an operating state of the deceleration adding device according to an operation state of the operation element, and when the determining device determines that the accelerator operation state is the return operation state, controls the deceleration adding device in the set operating state so as to add the deceleration to the vehicle.

2. A control apparatus according to claim 1, wherein
   the operation element is accelerator operation device that determines a running state of an engine, and
   the control device sets the operating state of the deceleration adding device according to a return operation state of the accelerator operation device.

3. A control apparatus according to claim 2, wherein the control device starts adding the deceleration a predetermined delay time after the accelerator operation device is rendered in the return operation state, and sets the delay time based on variation in an operation state of the accelerator operation device.

4. A control apparatus according to claim 3, wherein the control device sets the delay time to a larger value as a frequency at which the accelerator operation state is determined to be the return operation state is higher.

5. A control apparatus according to claim 3, wherein the control device sets the delay time to a larger value as a frequency at which the accelerator operation state varies is higher.

6. A control apparatus according to claim 5, wherein the control device conducts fast Fourier transform of the detected accelerator operation state, and determines the frequency at which the accelerator operation state varies based on a result of the fast Fourier transform.

7. A control apparatus according to claim 1, wherein the operation element is operation changing device that changes an operating state of an automatic transmission.

8. A control apparatus according to claim 7, wherein the operation changing device is shift-range selecting device.

9. A control apparatus according to claim 7, wherein the operation changing device is shift-mode changing device that selectively changes a shift mode between an auto-shift mode in which gearshift is automatically conducted according to a running state of the vehicle and a manual shift mode in which gearshift to a corresponding gear is conducted according to an operation state of a gearshift operation member by the driver.

10. A control apparatus according to claim 9, wherein in a case where the shift-mode changing device is in the auto-shift mode, the control device limits the deceleration to be added by the deceleration adding device as compared to a case where the shift-mode changing device is in the manual shift mode.

11. A control apparaus according to claim 9, wherein in a case where the shift-mode changing device is in the auto-shift mode, the control device limits a rate of change with time in the deceleration to be added by the deceleration adding device to a smaller value than in a case where the shift-mode changing device is in the manual shift mode.

12. A control apparatus according to claim 9, wherein the control device inhibits addition of the deceleration by the deceleration adding device in a case where the shift-mode changing device is in the auto-shift mode, and controls the deceleration adding device so as to add the deceleration to the vehicle in a case where the shift-mode changing device is in the manual shift mode.

13. A control apparatus according to claim 1, wherein the control device limits the deceleration to be added by the deceleration adding device, according to the operation state of the operation element.

14. A control apparatus according to claim 1, wherein the control device adjusts a rate of change with time in the deceleration to be added by the deceleration adding device, according to the operation state of the operation element.

15. A control apparatus according to claim 1, wherein the operation element is shift setting device that sets a shift pattern of an automatic transmission having a plurality of shift patterns, and the control device changes the operating state of the deceleration adding device according to the shift pattern set by the shift setting device.

16. A control apparatus according to claim 1, wherein the deceleration adding device adds the deceleration to the vehicle by controlling braking force.

17. A deceleration control method for adding deceleration to a vehicle by controlling deceleration adding device mounted in the vehicle, comprising the steps of:

detecting an accelerator operation state of a driver;

determining whether or not the detected accelerator operation state is a return operation state;

setting an operating state of the deceleration adding device according to an operation state of an operation element capable of being operated by the driver and provided to change an operating state of a vehicle movement controller other than the deceleration adding device; and controlling the deceleration adding device in the set operating state so as to add the deceleration to the vehicle, when it is determined that the accelerator operation state is the return operation state.

* * * * *